United States Patent
Lee et al.

(10) Patent No.: US 7,860,039 B2
(45) Date of Patent: Dec. 28, 2010

(54) APPARATUS AND METHOD FOR ESTABLISHING RADIO BEARER OF MOBILE TERMINAL

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 11/029,205

(22) Filed: Jan. 4, 2005

(65) Prior Publication Data
US 2005/0177620 A1    Aug. 11, 2005

(30) Foreign Application Priority Data
Jan. 9, 2004    (KR) ............... 10-2004-0001587

(51) Int. Cl.
*H04H 20/71*    (2008.01)
(52) U.S. Cl. ............. 370/312; 370/252; 370/394; 455/69; 455/421; 455/426.1; 455/434; 455/435.1; 455/450; 455/452.1; 455/452.2; 455/522
(58) Field of Classification Search ........ 370/312, 370/252, 394; 455/69, 426.1, 522, 421, 450, 455/452.1, 452.2, 435.1, 434
See application file for complete search history.

(56) References Cited

U.S. PATENT DOCUMENTS

| | | | |
|---|---|---|---|
| 6,343,070 B1 | 1/2002 | Klas et al. | |
| 6,434,389 B1* | 8/2002 | Meskanen et al. | 455/437 |
| 6,445,918 B1* | 9/2002 | Hellander | 455/423 |
| 2001/0018342 A1* | 8/2001 | Vialen et al. | 455/423 |
| 2002/0191556 A1 | 12/2002 | Krishnarajah et al. | |
| 2003/0040313 A1* | 2/2003 | Hogan et al. | 455/435 |
| 2003/0092375 A1* | 5/2003 | Iwanaga et al. | 455/3.01 |
| 2003/0119452 A1* | 6/2003 | Kim et al. | 455/69 |
| 2003/0186692 A1* | 10/2003 | Tamura | 455/422.1 |
| 2003/0194992 A1* | 10/2003 | Kim et al. | 455/414.1 |
| 2003/0207702 A1* | 11/2003 | Chen | 455/574 |
| 2003/0235213 A1* | 12/2003 | Kuo | 370/503 |

(Continued)

FOREIGN PATENT DOCUMENTS

EP    1311135 A1    5/2003

(Continued)

OTHER PUBLICATIONS

LG Electronics "Layer 2 entity sharing for MBMS" TSG-RAN Working Group 2 #39, Nov. 17-21, 2003.

(Continued)

*Primary Examiner*—Rafael Pérez-Gutiérrez
*Assistant Examiner*—Liton Miah
(74) *Attorney, Agent, or Firm*—Lee, Hong, Degerman, Kang & Waimey

(57)    ABSTRACT

A method for establishing radio bearer (RB) between a mobile terminal and a network in a wireless communication system. The mobile terminal receives RB information for a specific service from one or more cells and stores the received the RB information. If the mobile terminal is moved to one or more cells and then is moved back to the specific cell, the mobile terminal establishes an RB for the specific service according to the previously stored RB information of the specific cell rather than re-receiving the RB information.

5 Claims, 7 Drawing Sheets

U.S. PATENT DOCUMENTS

| | | | |
|---|---|---|---|
| 2004/0023679 A1* | 2/2004 | Shoobridge | 455/522 |
| 2004/0085926 A1* | 5/2004 | Hwang et al. | 370/328 |
| 2004/0087319 A1* | 5/2004 | Bos et al. | 455/458 |
| 2004/0142706 A1* | 7/2004 | Kim et al. | 455/458 |
| 2005/0047359 A1* | 3/2005 | Sebire | 370/312 |

FOREIGN PATENT DOCUMENTS

| | | |
|---|---|---|
| EP | 1 351 528 A1 | 10/2003 |
| EP | 1372350 A1 | 12/2003 |
| KR | 10-20030084516 | 1/2003 |
| RU | 2146081 C1 | 2/2000 |
| WO | 97/44922 | 11/1997 |
| WO | 01/89241 | 11/2001 |
| WO | WO 02/054818 A1 | 7/2002 |
| WO | 2005/018268 | 2/2005 |

OTHER PUBLICATIONS

LG Electronics Inc., "Layer 2 Entity Sharing for MBMS", TSG-RAN Working Group 2 #39, R2-032349, Nov. 17, 2003.

Cha, Y.W., et al., "Design and Validation of a Connection Control Protocol for Broadband Access Network," Information Science Journal, vol. 25, No. 10, pp. 1132-1142, Oct. 1998.

* cited by examiner

APPARATUS AND METHOD FOR ESTABLISHING RADIO BEARER OF MOBILE TERMINAL

CROSS-REFERENCE TO RELATED APPLICATIONS

Pursuant to 35 U.S.C. §119(a), this application claims the benefit of earlier filing date and right of priority to Korean Application No. 2004-0001587, filed on Jan. 9, 2004, the contents of which is hereby incorporated by reference herein in its entirety.

BACKGROUND OF THE INVENTION

1. Field of the Invention

The present invention relates to a method and apparatus for establishing a radio link between a mobile terminal and a network in a wireless communication system.

2. Description of the Related Art

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access technologies.

A related art UMTS network structure 1 is illustrated in FIG. 1. A mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality of base stations 12, or "Node Bs." The RNC 10 connected to a given base station 12 is the controlling RNC for allocating and managing the common resources provided for any number of UEs 2 operating in one cell. One or more cells exist in one node B. The controlling RNC 10 controls traffic load, cell congestion, and the acceptance of new radio links. Each Node B 12 may receive an uplink signal from a UE 2 and may transmit downlink signals to the UE. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example 3GPP specifications. These layers are based on the lower three layers of an open system interconnection (OSI) model that is a well-known in communications systems.

A related art architecture of the radio interface protocol is illustrated in FIG. 2. As shown, the radio interface protocol is divided horizontally into the physical layer, the data link layer, and the network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (transmitter).

The MAC layer of the second layer (L2) provides information transfer service to a higher layer and is linked via a logical channel to a radio link control (RLC) layer. The RLC layer of the second layer (L2) supports the transmission of reliable data and can perform segmentation and concatenation functions for RLC service data units (SDU) received from an upper layer.

The radio resource control (RRC) layer located at the lowest portion of the third layer (L3) is only defined in the control plane and controls transport channels and physical channels with respect to the establishment, re-establishment, and releasing of radio bearers. A radio bearer (RB) is a service provided by a lower layer, such as the RLC layer or the MAC layer, for transferring data between the UE 2 and the UTRAN 6.

The establishment of an RB determines regulating characteristics of the protocol layer and channel needed to provide a specific service, thereby establishing the parameters and operational methods of the service. When a connection is established to allow transmission between an RRC layer of a specific UE 2 and an RRC layer of the UTRAN 6, the UE 2 is said to be in the RRC-connected state. Without such connection, the UE 2 is in an idle state.

Hereafter, a Multimedia Broadcast/Multicast Service (MBMS or "MBMS service") will be described. MBMS refers to a method of providing streaming or background services to a plurality of UEs 2 using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs 2 within a broadcast area, for example the domain where the broadcast is available. The multicast mode is for transmitting multimedia data to a specific UE 2 group within a multicast area, for example the domain where the multicast service is available.

The UTRAN 6 provides the MBMS service to the UEs 2 using the RB. RBs used by the UTRAN 6 can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or SCCPCH (Secondary Common Control Physical Channel).

The point-to-multipoint RB is a unidirectional downlink RB, including a logical channel MTCH (MBMS Traffic Channel), a transport channel FACH (Forward Access Channel), and the physical channel SCCPCH. The logical channel MTCH is configured for each MBMS service provided to one cell and used to transmit user plane data of a specific MBMS service to the UEs 2.

The UTRAN 6 providing the MBMS service transmits MBMS-related RRC messages to the plurality of terminals (UEs 2) through an MCCH (MBMS Control Channel). Herein, the logical channel MCCH is the point-to-multipoint downlink channel and is mapped to the FACH, which is mapped to the SCCPCH.

The MBMS-related RRC messages transmitted through the MCCH typically comprise an MBMS service information message and an MBMS RB information message. The MBMS service information message transmitted to each cell includes a list of IDs for MBMS services ongoing, or set to be ongoing, in a corresponding and the type of RB for each MBMS service. If the specific MBMS service uses the point-to-multipoint RB in the corresponding cell, the MBMS RB information message includes information of the point-to-multipoint RB related to the corresponding MBMS service.

A terminal desiring to receive the specific MBMS service using the point-to-multipoint RB receives the MBMS service information message through the MCCH. If the received MBMS service information message indicates receiving the MBMS RB information message for the specific MBMS service, the terminal obtains information required for establishing an MBMS RB for receiving the specific MBMS in the terminal through the MBMS RB information message. In other words, if the received MBMS service information message includes an ID of the specific MBMS service and indicates that a type of RB for the specific MBMS is a point-to-multipoint RB, the terminal obtains point-to-multipoint RB information by receiving the MBMS RB information message and establishes the point-to-multipoint RB by using the information.

A related art process for establishing the MBMS RB for the specific MBMS service in a cell into which the mobile terminal (UE 2) has moved is illustrated in FIG. 3. As shown in FIG. 3, the mobile terminal moves from a cell A to a cell B, from the cell B to a cell C, and then from the cell C to the cell A. The UE 2 sequentially performs the steps 1, 2, 3 and 4 in the cells A-C.

The cells A-C provide a specific MBMS service the mobile terminal (UE 2) desires to receive, and transmit the MBMS service to the mobile terminal using a point-to-multipoint RB. Whenever the mobile terminal moves into a new cell, it receives an MBMS service information message and an MBMS RB information message. The UE 2 then establishes the point-to-multipoint RB for the new cell using the received information messages.

In step 1, the mobile terminal is positioned in the cell A and a session of the specific MBMS service desired to be received by the mobile terminal starts at this time. When the session starts, the mobile terminal receives an MBMS RB information message transmitted in the cell A and obtains information for a point-to-multipoint RB. The mobile terminal then establishes a point-to-multipoint MBMS RB using the obtained point-to-multipoint RB information and receives data of the specific MBMS service. Subsequently, the mobile terminal moves from the cell A to the cell B for performing step 2.

Thereafter, in steps 2, 3 and 4, the mobile terminal receives an MBMS RB information message transmitted from the corresponding cell while moving from one cell to other, and obtains point-to-multipoint MBMS RB information. The mobile terminal then establishes the point-to-multipoint MBMS RB using the obtained point-to-multipoint RB information and receives data of the specific MBMS from the corresponding cell.

According to the related art radio bearer establishing method of a mobile terminal, whenever the mobile terminal receives a specific MBMS service through a point-to-multipoint RB while moving through several cells, the mobile terminal will have received an MBMS RB information message for establishing an MBMS RB each time the mobile terminal moves into a cell. Accordingly, like step 4 of FIG. 3, when the mobile terminal returns to a cell previously entered into, such as the cell A, after passing through the other cells (cells B and C), the mobile terminal unnecessarily receives again the MBMS RB information message it had previously received for establishing the MBMS RB. This operation is problematic because the unnecessary reception of the MBMS RB information message causes a time delay in receiving MBMS service data after the mobile terminal moves into the cell and the MBMS RB is set. Furthermore, data is lost because the data cannot be received due to the delay.

SUMMARY OF THE INVENTION

The present invention is directed to a method for establishing a radio bearer (RB) of a mobile terminal to prevent re-receiving a point-to-multipoint radio bearer information message and to minimize data loss when the mobile terminal moves between cells.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus. In an exemplary embodiment, a method for establishing a radio link between a mobile terminal and a network in a wireless communication system comprises establishing communication with the network in a cell, receiving and storing radio bearer information associated with the cell, disconnecting communication with the network in the cell, reestablishing communication with the network in the cell, and establishing a point-to-multipoint radio bearer for a service using the stored radio bearer information upon reestablishing communication with the network in the cell.

In one aspect, the radio bearer information is received through an MBMS control channel (MCCH) of the cell. The method further comprises establishing a point-to-multipoint radio bearer for a service using the radio bearer information and receiving the service prior to disconnecting communication with the network. The service may comprise a point-to-multipoint service. Further, the radio bearer information may be point-to-multipoint radio bearer information.

In a detailed aspect, the method further comprises receiving a cell ID of the cell, determining a type of the received radio bearer information associated with the cell, establishing a point-to-point radio bearer for a service using the received radio bearer information if the received radio bearer information is determined to be point-to-point radio bearer information, and receiving the service using the point-to-point radio bearer.

In another aspect, the method further comprises receiving a cell ID of the cell, determining whether the cell ID and point-to-multipoint radio bearer information of the cell are stored in a memory if the received radio bearer information is determined to be point-to-multipoint radio bearer information, establishing a point-to-multipoint radio bearer for a service using the point-to-multipoint radio bearer information if it is determined that the cell ID and the point-to-multipoint radio bearer information of the cell are stored in the memory, and receiving the service using the point-to-multipoint radio bearer.

In yet another aspect, the method further comprises receiving a cell ID of the cell, determining whether the cell ID and point-to-multipoint radio bearer information of the cell are stored in a memory if the received radio bearer information is determined to be point-to-multipoint radio bearer information, storing the cell ID and the received radio bearer information in the memory if it is determined that either the cell ID or the point-to-multipoint radio bearer information is not stored in the memory, establishing a point-to-multipoint radio bearer for a service using the received radio bearer information, and receiving the service using the point-to-multipoint radio bearer.

In another aspect, the method further comprises receiving a cell ID of the cell, receiving update information of a point-to-multipoint radio bearer for a service, and determining whether the cell ID and point-to-multipoint radio bearer information of the cell are stored in a memory, wherein the update information is received through an MBMS control channel (MCCH) of the cell.

The method further comprises receiving current update information of a point-to-multipoint radio bearer associated with the cell if it is determined that the cell ID and the point-to-multipoint radio bearer information are stored in the memory, comparing the current update information of the point-to-multipoint radio bearer with stored update information of the point-to-multipoint radio bearer, establishing a point-to-multipoint radio bearer for the service using the stored update information of the point-to-multipoint radio bearer if the current update information of the point-to-multipoint radio bearer is the same as the stored update information of the point-to-multipoint radion bearer, and receiving the service using the point-to-multipoint radio bearer.

In another aspect, the method further comprises receiving a cell ID of the cell, receiving update information for a service, determining whether the cell ID and point-to-multipoint radio bearer information of the cell are stored in a memory, comparing the received update information with previously stored update information if it is determined that either the cell ID or the point-to-multipoint radio bearer information is not previously stored in the memory, and receiving current point-to-multipoint radio bearer information associated with the cell if the received update information is different from the stored update information.

The method further comprises storing the cell ID, the current point-to-multipoint radio bearer information and the received update information in the memory, establishing a point-to-multipoint radio bearer for the service using the current point-to-multipoint radio bearer information, and receiving the service using the point-to-multipoint radio bearer.

In a further aspect, storing radio bearer information associated with the cell comprises determining whether a number of radio bearer information items to be stored exceeds a threshold value in the mobile terminal, deleting a previously-stored radio bearer information item and storing the radio bearer information if the number of radio bearer information items to be stored exceeds the threshold value in the mobile terminal, and storing the radio bearer information if the number of radio bearer information items to be stored does not exceed the threshold value in the mobile terminal. The threshold value in the mobile terminal may be determined by the network or by the mobile terminal.

In one aspect, deleting a previously-stored radio bearer information item comprises deleting the radio bearer information item of a cell positioned farthest from the cell the mobile terminal is currently in. Furthermore, deleting a previously-stored radio bearer information item comprises deleting the oldest radio bearer information item among the stored radio bearer information items.

In a more detailed aspect, the method for establishing a radio link between a mobile terminal and a network in a wireless communication system further comprises deleting all radio bearer information items stored for the service during a specific session of the service when the specific session is terminated. The method may also further comprise deleting all radio bearer information items stored for the service during a specific session of the service when the mobile terminal deactivates the service. Also, the method may further comprise driving a timer when storing the radio bearer information and deleting the stored radio bearer information when the timer terminates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
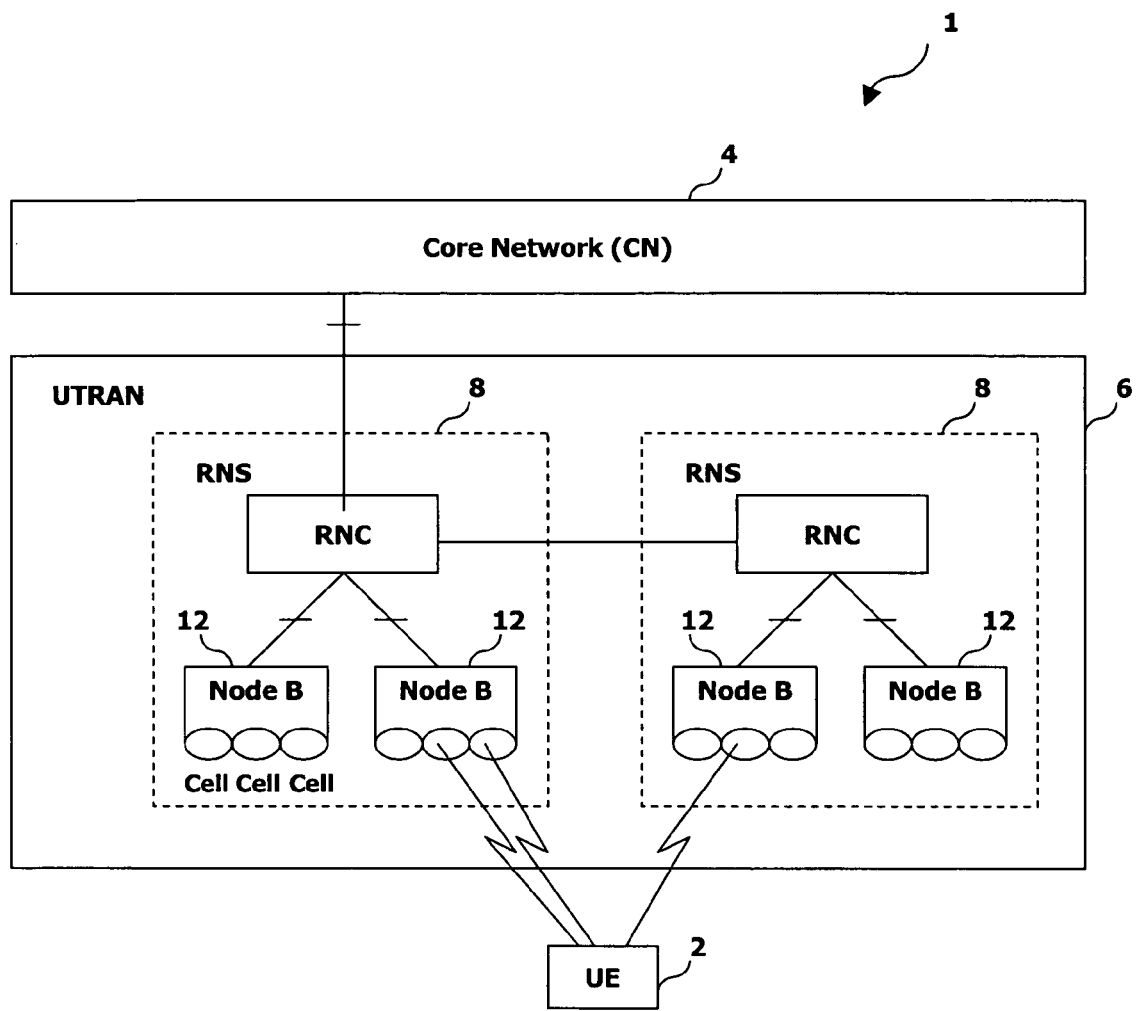
FIG. 1 illustrates a block diagram of a related art UMTS network structure.
Figure 2:
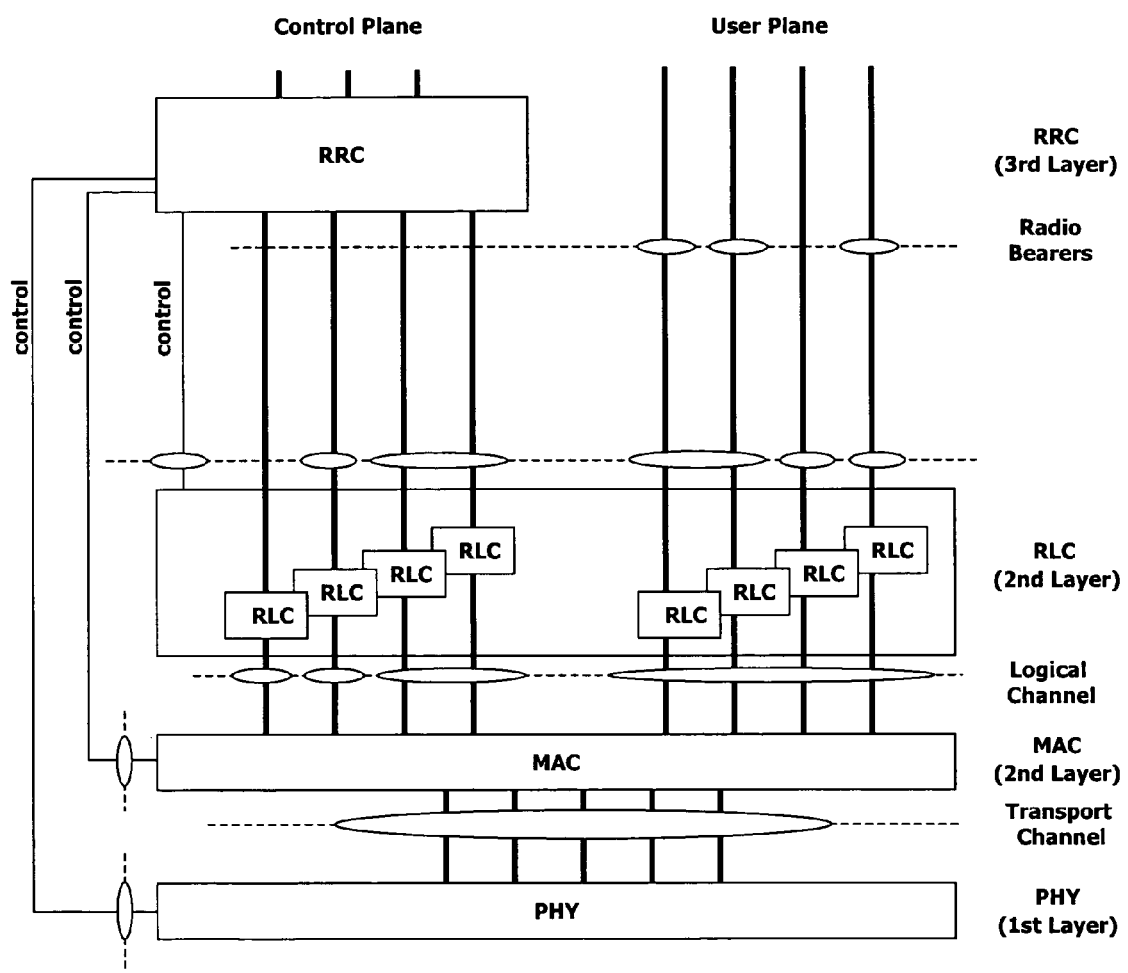
FIG. 2 illustrates a block diagram of the architecture of a related art interface protocol based 3GPP radio access network specifications.
Figure 3:
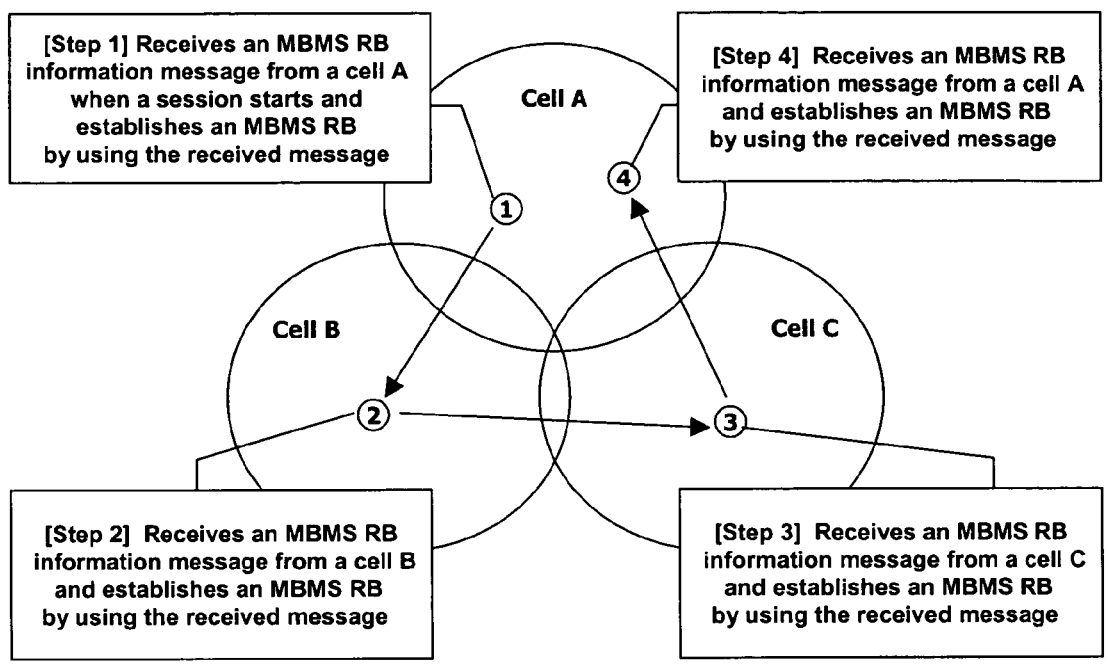
FIG. 3 illustrates a related art operation for establishing a point-to-multipoint RB for a specific point-to-multipoint service while a mobile terminal travels through a plurality of cells.
Figure 4:
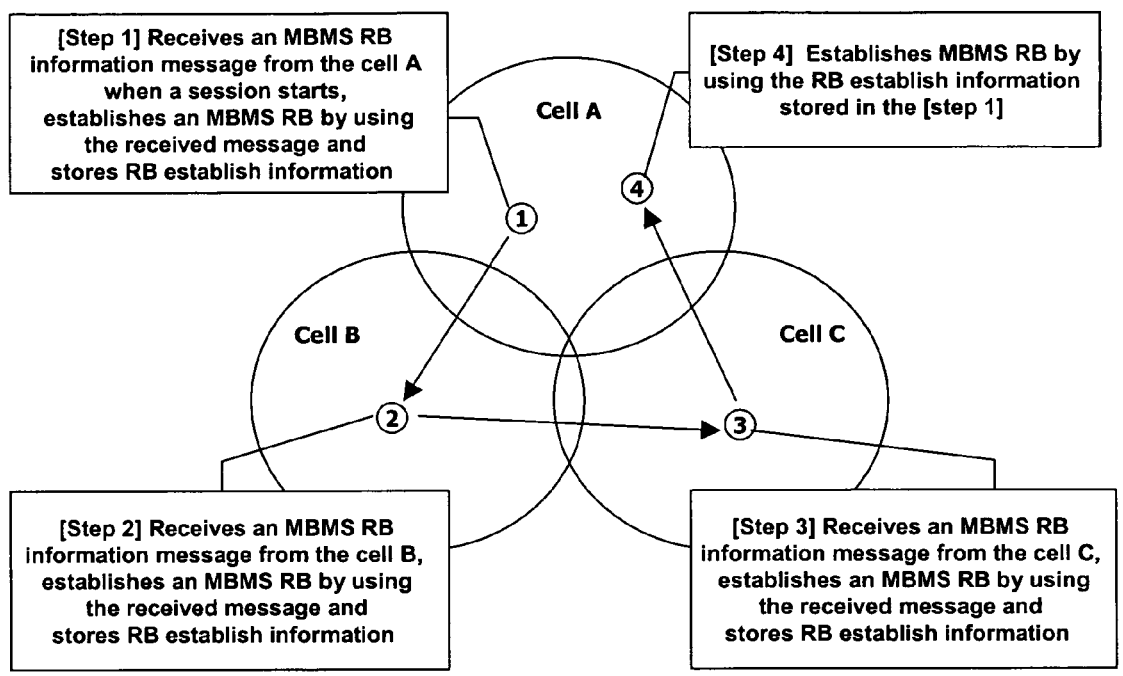
FIG. 4 illustrates an operation for establishing a point-to-multipoint RB for a specific point-to-multipoint service while a mobile terminal is travels through a plurality of cells in accordance with one embodiment of the invention.

The present invention relates to a method for establishing a radio bearer between a mobile terminal and a network in a wireless communication system. Referring to FIG. 4, a mobile terminal is moved from a cell A to a cell B, from the cell B to a cell C, and from the cell C back to the cell A. During the move, the mobile terminal sequentially performs step 1 in the cell A, step 2 in the cell B, step 3 in the cell C and step 4 when returning back to the cell A. Each cell of FIG. 4 provides a specific MBMS service desired to be received by the mobile terminal. The cells transmit the MBMS service to the mobile terminal using a point-to-multipoint radio bearer (RB).

In step 1, the mobile terminal is positioned in the cell A. At this time, a session of the specific MBMS service, which the mobile terminal desires to receive, is started. As the session starts, the mobile terminal receives an MBMS RB information message transmitted from the cell A and obtains point-to-multipoint MBMS RB information. The mobile terminal then establishes a point-to-multipoint MBMS RB using the obtained point-to-multipoint MBMS RB information and receives the specific MBMS service. In addition, the mobile terminal stores the obtained point-to-multipoint MBMS RB information. Thereafter, the mobile terminal is moved from the cell A to the cell B and performs step 2.

In step 2, the mobile terminal positioned in the cell B receives an MBMS RB information message transmitted from the cell B and obtains point-to-multipoint MBMS RB information. The mobile terminal then establishes a point-to-multipoint MBMS RB using the obtained point-to-multipoint MBMS RB information from the cell B and receives the specific MBMS service. In addition, the mobile terminal stores the obtained point-to-multipoint MBMS RB information. Thereafter, the mobile terminal is moved from the cell B to the cell C and performs step 3.

In step 3, the mobile terminal positioned in the cell C receives an MBMS RB information message transmitted from the cell C and obtains point-to-multipoint MBMS RB information. The mobile terminal then establishes a point-to-multipoint MBMS RB using the obtained point-to-multipoint MBMS RB information from the cell C and receives the specific MBMS service. In addition, the mobile terminal stores the obtained point-to-multipoint MBMS RB information. Thereafter, the mobile terminal is moved from the cell C back to the cell A and performs step 4.

In step 4, the mobile terminal has returned to the cell A. Here, the mobile terminal does not need to receive the point-to-multipoint MBMS RB information message from the cell A again to establish a point-to-multipoint MBMS RB. Instead, the mobile terminal establishes a point-to-multipoint MBMS RB using the point-to-multipoint MBMS RB information stored in step 1. Once the RB is established, the mobile terminal receives the specific MBMS service.

Figure 5:
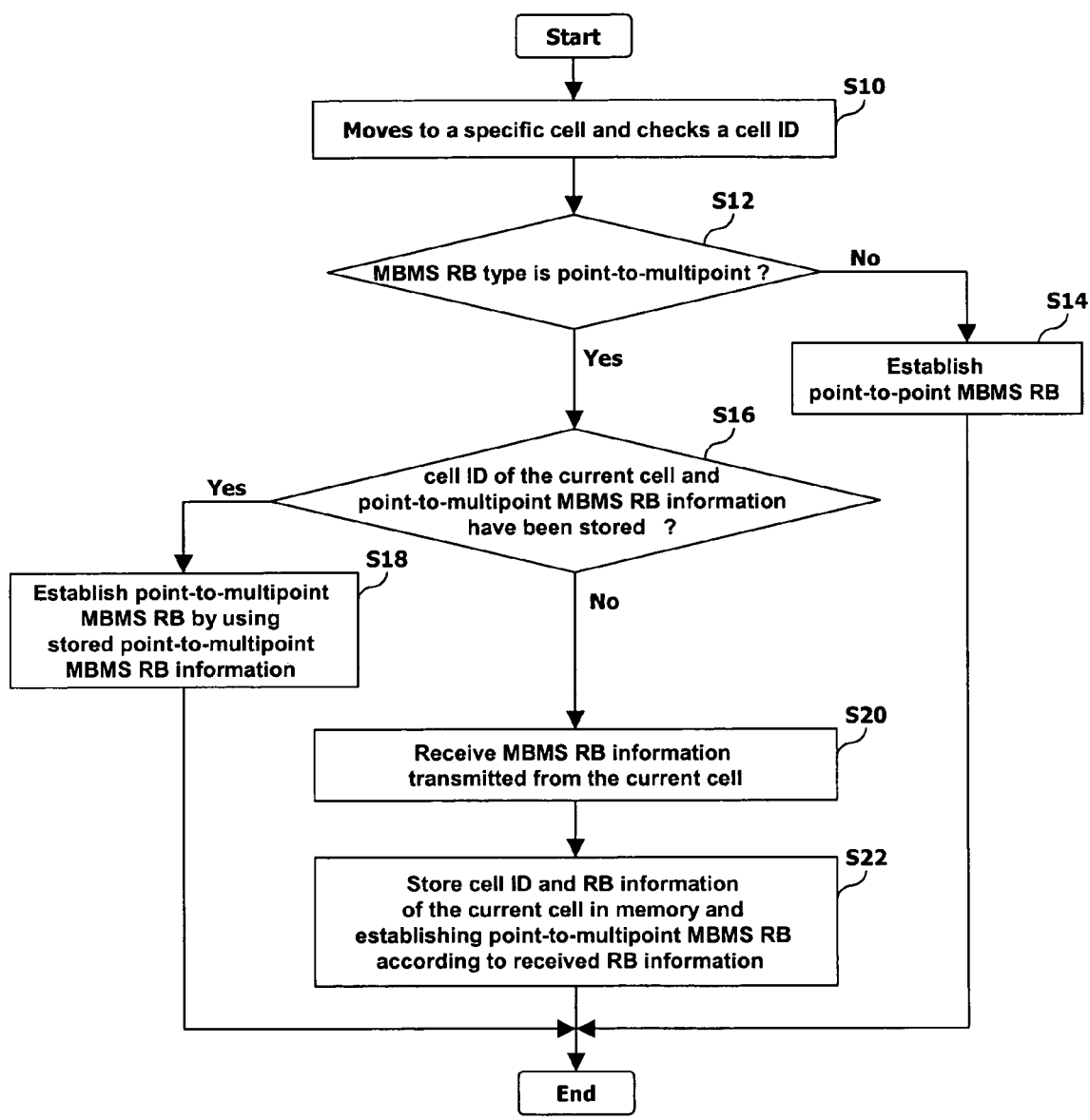
FIG. 5 illustrates a flow chart for establishing a point-to-multipoint RB when a mobile terminal is moved to a cell wherein point-to-multipoint RB information is not updatable during one session of a specific point-to-multipoint service in accordance with one embodiment of the invention.

Referring to FIG. 5, a method is illustrated for establishing an MBMS RB when a mobile terminal is moved to a cell wherein MBMS RB information is not updatable during one session of a specific MBMS service. First, the mobile terminal desiring to receive a specific MBMS service is moved to an arbitrary cell providing the specific MBMS service. There, the mobile terminal receives a cell ID transmitted from the cell (step S10). The mobile terminal then receives an MBMS information message through an MBMS Control Channel (MCCH) of the current cell and checks what type of MBMS RB the current cell establishes for the specific MBMS service (step S12).

If the current cell provides the specific MBMS using a point-to-point MBMS RB, the mobile terminal establishes the point-to-point MBMS RB under the control of a network and receives MBMS service data using the established RB (step S14). If the current cell provides the specific MBMS using a point-to-multipoint MBMS RB, the mobile terminal checks whether its internal memory has stored a cell ID and point-to-multipoint MBMS RB information for the current cell (step S16).

If the memory of the mobile terminal includes the cell ID and the point-to-multipoint MBMS RB information for the current cell, the mobile terminal establishes the point-to-multipoint MBMS RB for the MBMS service according to the stored point-to-multipoint MBMS RB information. The mobile terminal then receives MBMS service data using the established point-to-multipoint RB (step S18). However, if the memory does not have stored either the cell ID or the point-to-multipoint MBMS RB information for the current cell, the mobile terminal receives the point-to-multipoint MBMS RB information transmitted through the MCCH from the current cell (step S20).

The mobile terminal then stores the received cell ID and the point-to-multipoint MBMS RB information of the current cell in the memory and establishes a point-to-multipoint MBMS RB according to the point-to-multipoint MBMS RB information of the current cell. After, the mobile terminal receives the MBMS service data using the RB (step S22).

Figure 6:
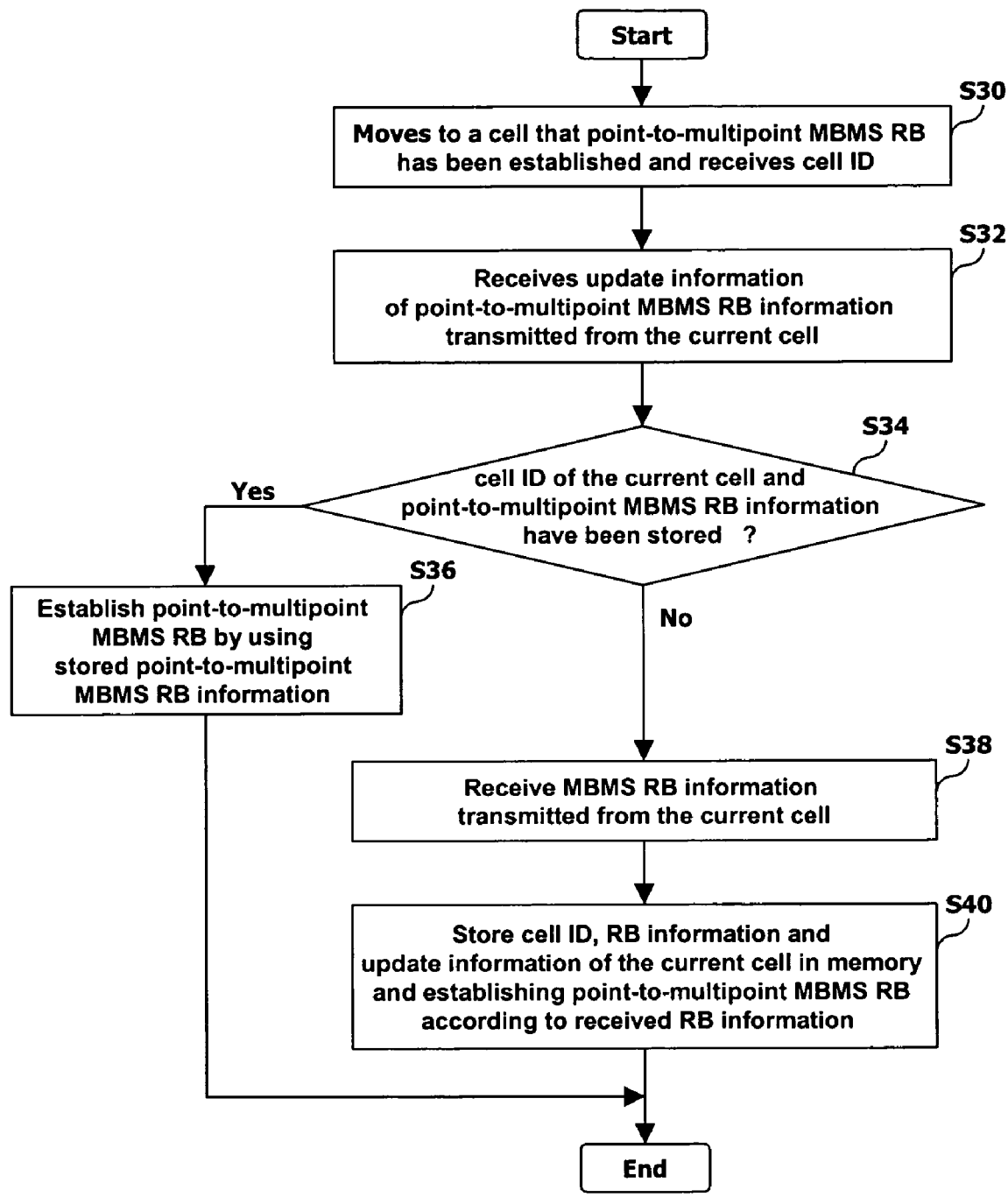
FIG. 6 illustrates a flow chart for establishing a point-to-multipoint RB when a mobile terminal is moved to a cell wherein point-to-multipoint RB information is updatable during one session of a specific point-to-multipoint service in accordance with one embodiment of the present invention.

Referring to FIG. 6, a method is illustrated for establishing an MBMS RB when a mobile terminal is moved to a cell wherein MBMS RB information is updatable during one session of a specific MBMS service. First, a UTRAN transmits update point-to-multipoint MBMS RB information to the mobile terminal through an MBMS Control Channel (MCCH). This informs the terminal of changes to the point-to-multipoint MBMS RB information of the cell the mobile terminal is currently in. The UTRAN manages the update information for each cell and each specific MBMS service. When the mobile terminal receives point-to-multipoint MBMS RB information from the cell, it must also receive the update information of the point-to-multipoint MBMS RB. While in the cell the mobile terminal has entered, the mobile terminal stores in a memory the point-to-multipoint MBMS RB information, the update information of the point-to-multipoint MBMS RB and the cell IDs of the cells which the terminal has entered that provide the specific MBMS service using the point-to-multipoint MBMS RB.

As shown in FIG. 6, the mobile terminal desiring to receive a specific MBMS service is moved to an arbitrary cell. There, the mobile terminal receives a cell ID transmitted from the cell providing the MBMS service using a point-to-multipoint MBMS RB (step S30). The mobile terminal then receives an MBMS RB information message transmitted through an MBMS Control Channel (MCCH) from the current cell. From the received MBMS information message, the mobile terminal obtains update information of the point-to-multipoint MBMS RB for the specific MBMS service from (step S32).

The mobile terminal checks whether the cell ID and point-to-multipoint MBMS RB information of the current cell have been previously stored in the internal memory for the MBMS service (step S34). If the cell ID and the point-to-multipoint MBMS RB information of the current cell have been stored in the memory, the mobile terminal receives point-to-multipoint MBMS RB information currently transmitted from the current cell. If, however, either the cell ID or the point-to-multipoint MBMS RB information of the current cell has not been stored in the memory, the mobile terminal compares received update information of the point-to-multipoint MBMS RB with stored update information of the point-to-multipoint MBMS RB. If the received update information is different from the stored update information, the mobile terminal receives the point-to-multipoint MBMS RB information currently transmitted from the current cell (step S38).

Meanwhile, if the cell ID and the point-to-multipoint MBMS RB information of the current cell have been stored in the memory, the mobile terminal receives the currently transmitted update information. If the currently transmitted update information is the same as the stored update information in the memory, the mobile terminal establishes the point-to-multipoint MBMS RB for the MBMS service using the stored point-to-multipoint MBMS RB information. The mobile terminal then receives MBMS service data using the established RB (step S36).

The mobile terminal stores the received cell ID, the point-to-multipoint MBMS RB information and the update information of the point-to-multipoint MBMS RB of the current cell in the memory. The mobile terminal also establishes the point-to-multipoint MBMS RB according to the point-to-multipoint MBMS RB information of the current cell and then receives the MBMS service data using the RB (step S40).

As described above, the mobile terminal compares update information of the point-to-multipoint MBMS RB obtained from the current cell with update information of the point-to-multipoint MBMS RB of the current cell stored in the memory. If the two are different, the mobile terminal determines that the content of the currently transmitted point-to-multipoint MBMS RB information is different from the content of the point-to-multipoint MBMS RB information stored in the memory. If, however, the two are the same, the mobile terminal determines that the content of the currently transmitted point-to-multipoint MBMS RB information is the same as the content of the point-to-multipoint MBMS RB information stored in the memory. For the update information of the point-to-multipoint MBMS RB, an update parameter having an integer value can be used.

Figure 7:
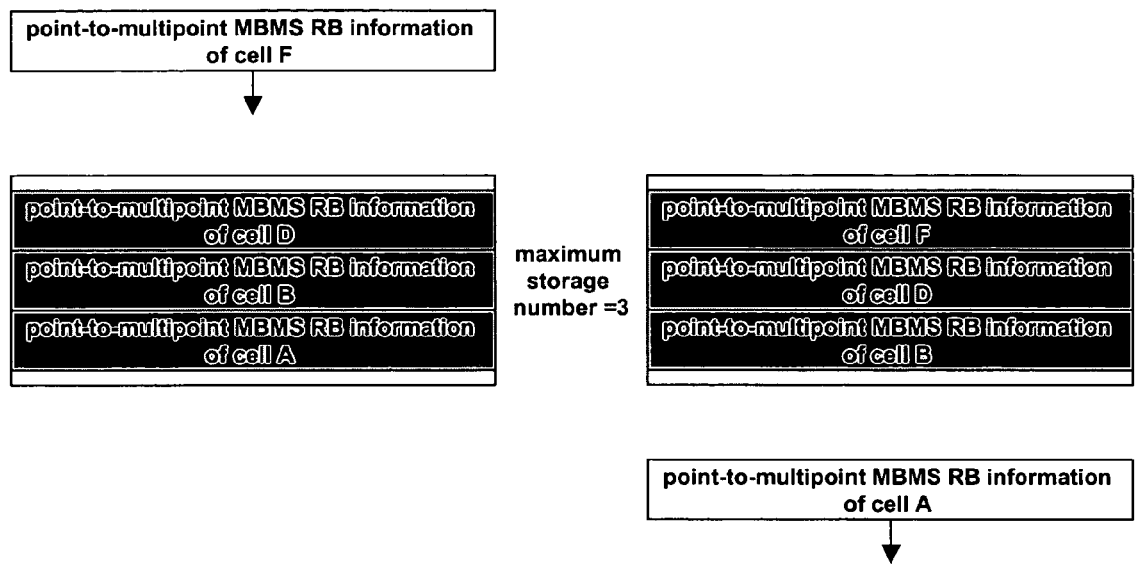
FIG. 7 illustrates a flow diagram for storing point-to-multipoint RB information of a mobile terminal in accordance with one embodiment of the present invention.

Referring to FIG. 7, a method is illustrated for storing point-to-multipoint MBMS RB information of a mobile terminal. If point-to-multipoint MBMS RB information of the current cell is received as shown in FIGS. 5 and 6, the mobile terminal needs to determine whether there is space for storing the point-to-multipoint MBMS RB information of the current cell in the memory before performing a storing operation.

For this purpose, the mobile terminal manages a threshold value in the mobile terminal such as a 'point-to-multipoint_MBMS_RB information_maximum storage number'. When the mobile terminal is to store a point-to-multipoint MBMS RB information item of the current cell in the memory, the terminal determines if the number of point-to-multipoint MBMS RB information items to be stored exceeds the threshold value in the mobile terminal. If so, the mobile terminal deletes one previously-stored point-to-multipoint MBMS RB information item in the memory in order to store a currently-received point-to-multipoint MBMS RB information item of the current cell. If, however, the number of point-to-multipoint MBMS RB information items to be stored is smaller than the threshold value in the mobile terminal, the mobile terminal stores the point-to-multipoint MBMS RB information item of the current cell without removing any previously stored point-to-multipoint MBMS RB information items.

The threshold value in the mobile terminal may be determined by the UTRAN and is transmitted from the UTRAN to the terminal before the terminal stores the point-to-multipoint MBMS RB information of the current cell in the memory. The terminal according to its capability may also determine the threshold value in the mobile terminal. One threshold value in the mobile terminal is determined for each MBMS service or each terminal.

Referring to FIG. 7, the maximum number of point-to-multipoint MBMS RB information items that the memory can store, namely, the "point-to-multipoint_MBMS_RB_maximum storage number" is three. Thus, the memory of the mobile terminal can store point-to-multipoint MBMS RB information for a maximum three cells.

As shown in FIG. 7, among a number of cells such as the cells A, B, C, D, E, F and G which the mobile terminal has passed through, the memory of the mobile terminal includes the point-to-multipoint MBMS RB information received from the cells A, B and D that have established the point-to-multipoint MBMS RB for the specific MBMS. Given that the maximum number of point-to-multipoint MBMS information items the memory can store is three, when the mobile terminal is moved into the cell F, the mobile terminal should remove one of the three point-to-multipoint MBMS RB information items stored in the memory in order to be able to store the point-to-multipoint MBMS RB information of the cell F. Preferably, the mobile terminal removes the point-to-multipoint MBMS RB information of a cell positioned farthest from the cell which the terminal is currently in or removes the oldest point-to-multipoint MBMS RB information item among the stored point-to-multipoint MBMS RB information items. Accordingly, the mobile terminal removes the point-to-multipoint MBMS RB information for the cell A, as shown in FIG. 7, and stores the point-to-multipoint MBMS RB information for the cell F in the memory.

When the mobile terminal stores the point-to-multipoint MBMS RB information for one cell, it also stores along with it a cell ID of the cell in the memory. Here, the point-to-multipoint MBMS RB information and the cell ID are in a one-to-one relationship. Thus, when the point-to-multipoint MBMS RB information is stored in the memory, the cell ID for the point-to-multipoint MBMS RB information should be also stored. Additionally, if the point-to-multipoint MBMS RB information is deleted from the memory, the cell ID for the point-to-multipoint MBMS RB information should also be deleted.

If the update information of the point-to-multipoint MBMS RB, as shown in FIG. 6, is used, the mobile terminal also stores the update information of the point-to-multipoint MBMS RB when storing the point-to-multipoint MBMS RB information for one cell. In this case, the point-to-multipoint MBMS RB information and the update information of the point-to-multipoint MBMS RB are also in a one-to-one relationship.

The mobile terminal can recognize for which cell the stored point-to-multipoint MBMS RB information is by checking the stored point-to-multipoint MBMS RB information and the cell ID. In addition, the mobile terminal can check for identity between two cell IDs by comparing a received cell ID for the current cell to a cell ID stored in the memory. If the received cell ID is the same as the cell ID stored in the memory, and if point-to-multipoint MBMS RB information having a one-to-one relationship with the stored cell ID has been also stored in the memory, then the mobile terminal determines that the point-to-multipoint MBMS RB information has been stored in the memory.

Furthermore, there are preferably three memory data deletion methods of the present invention. In the first memory data deletion method, if the specific session of the MBMS service is terminated, the mobile terminal deletes all the point-to-multipoint MBMS RB information items that have been stored in the memory for the specific MBMS service during the session. Thus, the mobile terminal can use the point-to-multipoint MBMS RB information stored in the memory for the specific MBMS service only during one specific session of the MBMS service. Preferably, if the mobile terminal receives an RB release message or a session stop message for the MBMS service from a system, the mobile terminal deletes the stored point-to-multipoint MBMS RB information for the service from the memory.

In the second memory data deletion method, when the mobile terminal deactivates the MBMS service, it deletes all the stored point-to-multipoint MBMS RB information for the service during the session from the memory. Thus, the terminal can use the point-to-multipoint MBMS RB information stored in the memory for the specific MBMS service during every session of the service. Preferably, when the mobile terminal deletes UE Context information for the MBMS service, it deletes all the stored point-to-multipoint MBMS RB information for the service from the memory.

In the third memory data deletion method, the mobile terminal drives a timer for all information (cell ID, point-to-multipoint MBMS RB information and update information of the point-to-multipoint MBMS RB) in the memory with respect to one cell. The mobile terminal deletes the information with respect to the cell when the timer expires. Accordingly, when the terminal stores in the memory the point-to-multipoint MBMS RB information with respect to one cell, the timer for the deletion of the information of the cell is driven.

In the embodiment of FIG. 7, the mobile terminal drives a timer Tf when storing the point-to-multipoint MBMS RB information of the cell F. When the timer Tf is terminated, the mobile terminal deletes the point-to-multipoint MBMS RB information of the cell F from the memory. When the point-to-multipoint MBMS RB information of the cell F is deleted, the cell ID and the update information of the point-to-multipoint MBMS RB having the one-to-one relationship with the information are also deleted. For example, if the mobile terminal stores the point-to-multipoint MBMS RB information of the cells A, B and D, the mobile terminal drives timers Ta, Tb and Tc, respectively. When one of the timers is terminated, the mobile terminal deletes the information corresponding to the timer from the memory. The mobile terminal uses a value stored in the mobile terminal or a value received from the system as the termination time of the timer.

As described above, in the method for establishing an RB in accordance with the present invention, the mobile terminal stores RB information of cells that it has passed through, so that when the mobile terminal moves back to a cell previously entered, it establishes an RB using the previously stored RB information, rather than re-receiving an MBMS RB information message in the corresponding cell. Thus, the mobile terminal does not need to re-receive the MBMS RB information message unnecessarily. Also, data loss as a result of moving between cells is minimized.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for establishing a radio link between a mobile terminal and a network in a wireless communication system, the method comprising:
    receiving control information for a point-to-multipoint service in a new cell when the mobile terminal moves into the new cell;
    determining whether or not the new cell belongs to a same point-to-multipoint service cell group based on the received control information,
    wherein the mobile terminal does not re-establish a Multimedia Broadcast/Multicast Service (MBMS) Radio Bearer (RB) for the point-to-multipoint service if the new cell is determined to be in the same point-to-multipoint service cell group by the determining step,
    wherein the control information includes an MBMS cell group identity, and
    wherein the cell group identity identifies the group of cells for which the same Multimedia Broadcast/Multicast Service (MBMS) Radio Bearer (RB) is used as a current cell,
    receiving update information for the point-to-multipoint service;
    determining whether the MBMS cell group ID and point-to-multipoint radio bearer information of the cell are stored in a memory;
    comparing the received update information with previously stored update information if it is determined that either the MBMS cell group ID or the point-to-multipoint radio bearer information is not previously stored in the memory;

receiving current point-to-multipoint radio bearer information associated with the cell if the received update information is different from the stored update information;

storing the MBMS cell group ID, the current point-to-multipoint radio bearer information and the received update information in the memory;

establishing a point-to-multipoint radio bearer for the point-to-multipoint service using the current point-to-multipoint radio bearer information;

receiving the point-to-multipoint service using the point-to-multipoint radio bearer;

determining whether a number of radio bearer information items to be stored exceeds a threshold value of a mobile terminal parameter;

deleting a previously-stored radio bearer information item and storing the current point-to-multipoint radio bearer information if the number of radio bearer information items to be stored exceeds the threshold value of the mobile terminal parameter; and storing the current point-to-multipoint radio bearer information if the number of radio bearer information items to be stored does not exceed the threshold value of the mobile terminal parameter.

2. The method of claim 1, wherein the mobile terminal is moved into the new cell while receiving data for the point-to-multipoint service.

3. The method of claim 2, wherein the data for the point-to-multipoint service is received on a MBMS traffic channel (MTCH) and the control information for the point-to-multipoint service is received on a MBMS control channel (MCCH).

4. The method of claim 1, wherein the new cell is determined to be in the same point-to-multipoint service cell group when radio bearer (RB) information associated with the cell is previously stored.

5. The method of claim 1, wherein the new cell is determined to be in a different point-to-multipoint service cell group when radio bearer (RB) information associated with the cell is not previously stored.

* * * * *